United States Patent
Chen et al.

(10) Patent No.: US 11,372,587 B2
(45) Date of Patent: Jun. 28, 2022

(54) MEMORY DEVICE AND METHOD FOR MANAGING READ COUNTS OF MEMORY DEVICE

(71) Applicant: MACRONIX International Co., Ltd., Hsinchu (TW)

(72) Inventors: Yen-Hsiang Chen, Hsinchu (TW); Nai-Ping Kuo, Hsinchu (TW)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 99 days.

(21) Appl. No.: 16/882,120

(22) Filed: May 22, 2020

(65) Prior Publication Data
US 2021/0365213 A1    Nov. 25, 2021

(51) Int. Cl.
*G06F 3/06* (2006.01)
*G06F 11/10* (2006.01)

(52) U.S. Cl.
CPC ............ *G06F 3/0659* (2013.01); *G06F 3/064* (2013.01); *G06F 3/0611* (2013.01); *G06F 3/0679* (2013.01); *G06F 11/1068* (2013.01)

(58) Field of Classification Search
None
See application file for complete search history.

(56) References Cited

U.S. PATENT DOCUMENTS

| 2014/0281766 A1* | 9/2014 | Yang | G11C 11/56 714/721 |
| 2016/0155516 A1* | 6/2016 | Chang | G11C 16/349 714/721 |
| 2019/0066809 A1* | 2/2019 | Kumar | G06F 11/1072 |

OTHER PUBLICATIONS

K. Ha, J. Jeong and J. Kim, "An Integrated Approach for Managing Read Disturbs in High-Density NAND Flash Memory," in IEEE Transactions on Computer-Aided Design of Integrated Circuits and Systems, vol. 35, No. 7, pp. 1079-1091, Jul. 2016, doi: 10.1109/TCAD.2015.2504868. (Year: 2016).*

* cited by examiner

*Primary Examiner* — Jared I Rutz
*Assistant Examiner* — Marwan Ayash
(74) *Attorney, Agent, or Firm* — J.C. Patents

(57) ABSTRACT

A memory device and a method for reducing read disturb errors of the memory device are provided. The memory device includes a plurality of memory cells arranged in series and organized into a plurality of blocks, a plurality of word lines respectively coupled to corresponding memory cells, and a controller coupled to the word lines for performing page read operations on the pages in respective blocks through corresponding word lines, in which each of the blocks comprises a plurality of pages of two or more types. The controller accumulates a page read count of the pages of each type in respective blocks, and arranges data to be stored according to the page read count and a latency factor corresponding to the pages of each type in each of the blocks.

9 Claims, 4 Drawing Sheets

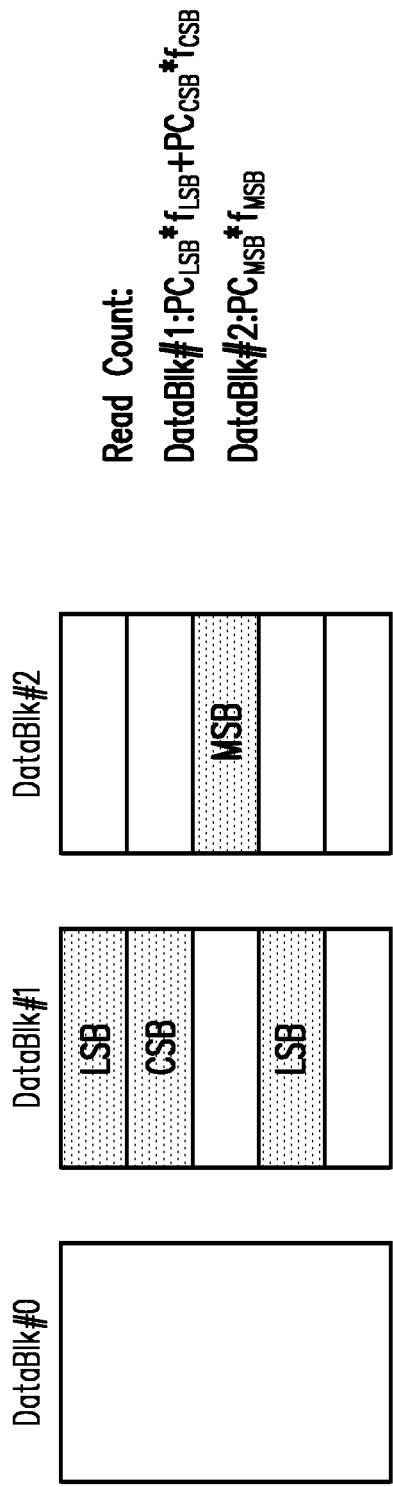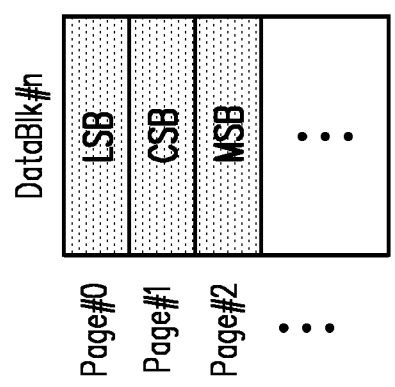
FIG. 4
FIG. 5

MEMORY DEVICE AND METHOD FOR MANAGING READ COUNTS OF MEMORY DEVICE

BACKGROUND

Field of the Disclosure

The present disclosure relates to a memory device and an operation method thereof, and more particularly, to a memory device and a method for managing read counts of the memory device.

Description of Related Art

Flash memory devices are generally implemented using NAND or NOR architecture. The NAND architecture is popular for its high density and high speed when applied to data storage applications. As the density increases in memory devices, the memory cells get closer and closer, and interference between the charges stored in adjacent charge storage layers (e.g. floating gates or dielectrics) becomes serious. Accordingly, read disturb becomes a major reliability issue in NAND flash memory, and a read count is a key factor reflecting the read disturb. A memory block with a higher read count means read disturb occurred therein is more serious, and such a memory block is subject to reliability checking with high priority.

For example, FIG. 1 is an example for calculating read counts of data blocks of a memory device. Typically, memory cells in a NAND flash are arranged into blocks and pages. A page is a group of data bits that are accessed in a parallel manner. In the example of FIG. 1, four data blocks DataBlk #0 to DataBlk #3 in a NAND flash are illustrated. When NAND page read operations are performed on the pages of each of the data blocks DataBlk #0 to DataBlk #3, a read count of each of the data blocks DataBlk #0 to DataBlk #3 is accumulated. As the page read operations are performed on two pages in the data block DataBlk #1, the read count of the data block DataBlk #1 is accumulated to 2. As the page read operation is performed on one page in the data block DataBlk #2, the read count of the data block DataBlk #2 is accumulated to 1. The accumulated read counts are recorded in a read count table 10 and are used for determining weak blocks when managing data in the memory device.

Accordingly, it is desirable to provide a method suitable for managing the read counts, so as to identify the weak blocks more efficiently and precisely.

SUMMARY

In view of the above, the present disclosure provides a memory device and a method for managing read counts of the memory device capable of identifying the weak blocks more efficiently and precisely.

The present disclosure provides a memory device comprising a plurality of memory cells arranged in series and organized into a plurality of blocks, a plurality of word lines respectively coupled to corresponding memory cells in the plurality of memory cells, and a controller coupled to the plurality of word lines for performing page read operations on the pages in respective blocks through the corresponding word lines. Each of the blocks comprises a plurality of pages of two or more types. The controller is configured to accumulate a page read count of the pages of each type in respective blocks, wherein the page read count refers to a number of times the pages of each type have been read before an error occurs; and arrange data to be stored according to the page read count and a latency factor corresponding to the pages of each type in each of the blocks.

In an embodiment of the disclosure, the arranging of the data to be stored according to the page read count and the latency factor corresponding to the pages of each type in each of the blocks comprises calculating a block read count for each of the blocks according to a product of the page read count and the latency factor corresponding to the pages of each type in the block, and arranging the data to be stored according to the calculated block read counts.

In an embodiment of the disclosure, the calculating of the controller comprises multiplying the page read count with the latency factor corresponding to the pages of each type in the block and calculating a summation of multiplication results to serve as the block read count.

In an embodiment of the disclosure, the calculating of the controller comprises multiplying the page read count with the latency factor corresponding to the pages of each type in the block and calculating a product of a summation of multiplication results and a disturb factor of the block to serve as the block read count.

The present disclosure provides a method for reducing read disturb errors of a memory device, adapted to the memory device comprising a plurality of memory cells arranged in series and organized into a plurality of blocks, a plurality of word lines respectively coupled to corresponding memory cells and a controller. Each of the blocks comprises a plurality of pages of two or more types. In the method, page read operations are performed on the pages in respective blocks through the corresponding word lines. A page read count of the pages of each type in respective blocks is accumulated, wherein the page read count refers to a number of times the pages of each type have been read before an error occurs. The data to be stored is arranged according to the page read count and a latency factor corresponding to the pages of each type in each of the blocks.

In an embodiment of the disclosure, the step of arranging data to be stored according to the page read count and the latency factor corresponding to the pages of each type in each of the blocks comprises calculating a block read count for each of the blocks according to a product of the page read count and the latency factor corresponding to the pages of each type in the block, and arranging the data to be stored according to the calculated block read counts.

In an embodiment of the disclosure, the step of calculating the block read count for each of the blocks according to the product of the page read count and the latency factor corresponding to the pages of each type in the block comprises multiplying the page read count with the latency factor corresponding to the pages of each type in the block and calculating a summation of multiplication results to serve as the block read count.

In an embodiment of the disclosure, the step of calculating the block read count for each of the blocks according to the product of the page read count and the latency factor corresponding to the pages of each type in the block comprises multiplying the page read count with the latency factor corresponding to the pages of each type in the block and calculating a product of a summation of multiplication results and a disturb factor of the block to serve as the block read count.

The present disclosure provides a memory device comprising a plurality of memory cells arranged in series and organized into a plurality of blocks, a plurality of word lines respectively coupled to corresponding memory cells in the plurality of memory cells, and a controller comprises an error-correcting circuitry configured to correct errors occurred during page read operations of the memory cells, wherein the controller is coupled to the plurality of word lines for performing the page read operations on the pages in respective blocks through corresponding word lines. Each of the blocks comprises a plurality of pages of two or more types. The controller is configured to, in response to a number of the memory cells in one of the blocks corrected by the error-correcting circuitry being over a threshold, accumulate a page read count of the pages of each type in respective blocks, wherein the page read count refers to a number of times the pages of each type have been read before an error occurs; and arrange data to be stored according to the page read count and a latency factor corresponding to the pages of each type in each of the blocks.

In an embodiment of the disclosure, the controller is configured to calculate a block read count for each of the blocks according to a product of the page read count and the latency factor corresponding to the pages of each type in the block, and arrange the data to be stored according to the calculated block read counts.

In an embodiment of the disclosure, the disturb factor is determined according to one or a combination of a read latency, a program-erase cycle, and an operation temperature of the block.

In an embodiment of the disclosure, the latency factor corresponding to the pages of each type is determined according to a read latency of the pages of the respective type.

In an embodiment of the disclosure, the latency factor corresponding to the pages of each type is proportional to the read latency of the pages of the respective type.

In an embodiment of the disclosure, the types of the pages comprises a high page and a low page of a multi-level cell (MLC) NAND, or a least significant bit (LSB) page, a center significant bit (CSB) page, and a most significant bit (MSB) page of a triple-level cell (TLC) NAND.

In order to make the aforementioned features and advantages of the disclosure more comprehensible, embodiments accompanying figures are described in detail below.

BRIEF DESCRIPTION OF THE DRAWINGS

FIG. 4 is an example of calculating block read counts according to an embodiment of the disclosure.

FIG. 5 is an example of calculating block read counts according to an embodiment of the disclosure.

DESCRIPTION OF EMBODIMENTS

The read count increment of each block in a memory device is dependent on page read operation counts of each block. The read disturb may be affected by various factors such as read latency, program/erase (P/E) cycle, temperature of the blocks, and therefore in the present application the read counts are appropriated adjusted by latency factors and/or disturb factors determined according to characteristics of memory pages or blocks when being read, so as to reduce read disturb errors of the memory device.

Figure 1:
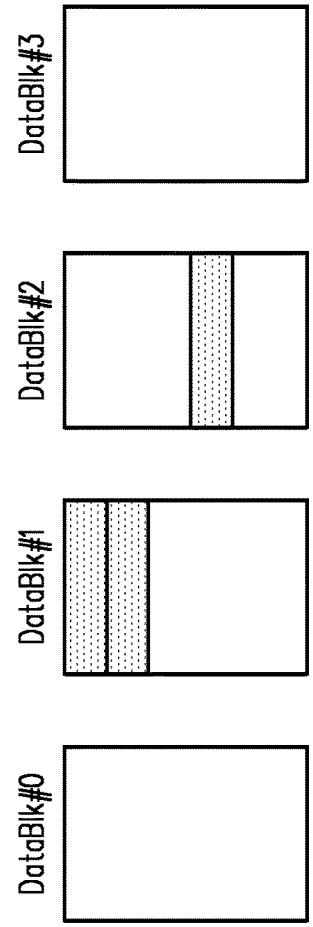
FIG. 1 is an example for calculating read counts of data blocks of a memory device.
Figure 2:
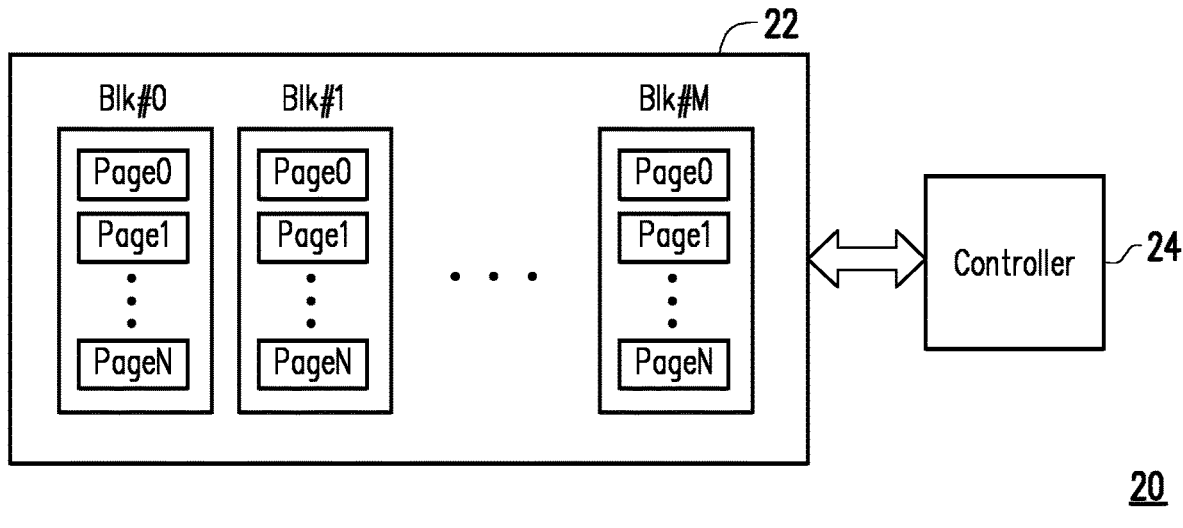
FIG. 2 is a schematic diagram illustrating the architecture of a memory device according to an embodiment of the application.

FIG. 2 is a schematic diagram illustrating the architecture of a memory device according to an embodiment of the application. Referring to FIG. 2, a memory device 20 is, for example, a NAND flash or a NOR flash, or any other type of memory, which is not limited in the present embodiment. The memory device 20 includes a memory 22 and a controller 24. The memory 22 includes a plurality of memory cells arranged in series and organized into a plurality of blocks Blk #0 to Blk #M, and each of the blocks Blk #0 to Blk #M includes a plurality of pages Page® to PageN of two or more types, in which both M and N are positive integers. The memory 22 further includes a plurality of wordlines (not shown) respectively coupled to corresponding memory cells in the plurality of memory cells such that the controller 24 is able to perform page read operations on the pages in respective blocks Blk #0 to Blk #M through the corresponding word lines. In some embodiments, the memory 22 further includes a wordline driver (not shown) such as a digital-to-analog converter (DAC) or an inverter to convert an input data into input voltages so as to write the input data to the memory cells.

The controller 24 is, for example, a central processing unit (CPU), or other programmable general-purpose or specific-purpose microprocessor, microcontroller (MCU), programmable controller, application specific integrated circuits (ASIC), programmable logic device (PLD) or other similar devices or a combination of these devices; the embodiment provides no limitation thereto. In the present embodiment, the controller 24 is configured to execute instructions for performing the method for managing read counts of the memory device as described below.

Figure 3:
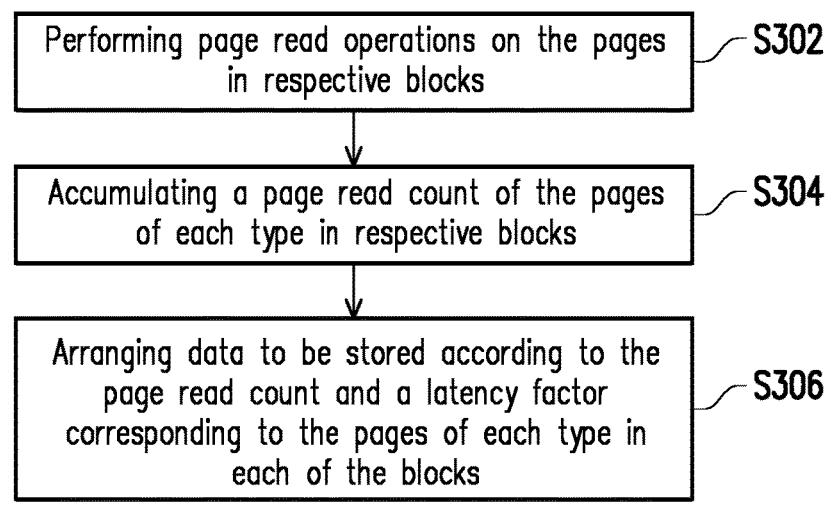
FIG. 3 is a schematic diagram illustrating a method for managing read counts of a memory device according to an embodiment of the disclosure.

FIG. 3 is a schematic diagram illustrating a method for managing read counts of a memory device according to an embodiment of the disclosure. Referring to FIG. 2 and FIG. 3, the method of the present embodiment is adapted for the above-mentioned memory device 20, and the detailed steps of the method will be described below with reference to various devices and components of the memory device 20.

First, in step S302, the controller 24 performs page read operations on the pages in respective blocks through the corresponding word lines. For example, the controller 24 performs page read operations on the pages Page® to PageN in block Blk #0, then performs page read operations on the pages Page® to PageN in block Blk #1, and so on until the pages Page® to PageN in block Blk #M. In one embodiment, the controller 24 reads the data bits in one page in a parallel manner, checks whether there is an error in the read data, and proceeds to read the data bits in another page if no error is found in the read data.

In step S304, the controller 24 accumulates a page read count of the pages of each type in respective blocks. In detail, when read disturb occurs during the page read operation, an error occurs in the read data, and the page read operation is performed again until correct data is read (i.e. no error occurs). The page read count refers to a number of times the pages of each type have been read before an error occurs. That is, the page read count is accumulated whenever an error occurs in the read data, and then the page is read again until no error occurs.

In step S306, the controller 24 arranges data to be stored according to the page read count and a latency factor corresponding to the pages of each type in each of the blocks. In some embodiments, the controller 24 calculates a block read count for each of the blocks according to a product of the page read count and the latency factor corresponding to the pages of each type in the block, and then arranges data to be stored according to the calculated block read counts. In one embodiment, the controller 24 multiplies the page read count with the latency factor corresponding to the pages of each type in the block and calculates a summation of multiplication results to serve as the block read count. In another embodiment, the controller 24 multiplies the page read count with the latency factor corresponding to the pages of each type in the block and calculates a product of a summation of multiplication results and a disturb factor of the block to serve as the block read count. The disturb factor is determined according to a read latency, a P/E cycle, an operation temperature, or any other characteristic of the block.

In detail, page read latency varies according to the page type, and if the page read latency is longer, the disturbance of other wordlines is worse. For example, the page read latencies of a high page and a low page of a multi-level cell (MLC) NAND are different, and the page read latencies of a least significant bit (LSB) page, a center significant bit (CSB) page, and a most significant bit (MSB) page of a triple-level cell (TLC) NAND are different. Accordingly, a latency factor reflecting the degree of read count affected by the disturbance is determined for each page type according to a read latency of the pages of the respective type. In some embodiments, the latency factor corresponding to the pages of each type is proportional to the read latency of the pages of the respective type.

In the step of arranging data to be stored according to the calculated block read counts, the controller 24 checks the block read count of each block to find the weak blocks that are vulnerable to the read disturb, and accordingly arranges data to be away from those blocks. In some embodiments, the controller 24 may move data stored in the blocks with high block read counts to the blocks with low read counts, so as to reduce read disturb errors. In some embodiments, when receiving a request for storing new data, the controller 24 may store the data in the blocks with low read counts, so as to reduce read disturb errors.

For example, FIG. 4 is an example of calculating block read counts according to an embodiment of the disclosure. Referring to FIG. 4, a TLC NAND flash including blocks DataBlk #0 to DataBlk #2 is given as an example, and page read operations are performed on pages of LSB, CSB and MSB in the blocks DataBlk #0 to DataBlk #2. As shown in FIG. 4, no page read operation is performed on the block DataBlk #0, page read operations are performed on two LSB pages and one CSB page in the block DataBlk #1, and page read operations are performed on one MSB page in the block DataBlk #2. Accordingly, a page read count $PC_{LSB}$ of the LSB page and a page read count $PC_{MSB}$ of the CSB page in the block DataBlk #1 are accumulated, and a page read count $PC_{MSB}$ of the MSB page in the block DataBlk #2 are accumulated. A set of latency factors $f_{LSB}$, $f_{CSB}$ and $f_{MSB}$ corresponding to the LSB, CSB and MSB page that are proportional to the read latency of the LSB, CSB and MSB pages are given. Then, a block read count of the block DataBlk #1 is calculated by multiplying the page read count $PC_{LSB}$ of the LSB page with the latency factor $f_{LSB}$ corresponding to the LSB page, multiplying the page read count $PC_{MSB}$ of the CSB page with the latency factor $f_{CSB}$ corresponding to the CSB page and summing the multiplication results. Similarly, a block read count of the block DataBlk #2 is calculated by multiplying the page read count $PC_{MSB}$ of the MSB page with the latency factor $f_{MSB}$ corresponding to the MSB page. Based on the block read counts calculated above, the TLC NAND flash is able to arrange data to be stored in the blocks DataBlk #0 to DataBlk #2, so as to reduce the error caused by the read disturb.

FIG. 5 is an example of calculating block read counts according to an embodiment of the disclosure. Referring to FIG. 5, a TLC NAND block DataBlk #n is given as an example, and page read operations are performed on pages of LSB, CSB and MSB (e.g. Page #0, Page #1, and Page #2) in the block DataBlk #n. As shown in FIG. 5, page read operations are performed on LSB pages, CSB pages and MSB pages in the block DataBlk #n, respectively. Accordingly, a page read count $PC_{LSB}$ of the LSB page, a page read count $PC_{CSB}$ of the CSB page and a page read count $PC_{MSB}$ of the MSB page are accumulated. A set of latency factors $f_{LSB}$, $f_{CSB}$ and $f_{MSB}$ corresponding to the LSB, CSB and MSB page that are proportional to the read latency of the LSB, CSB and MSB page and a disturb factor $F_{Disturb}$ corresponding to the block DataBlk #n are given. It is noted the block with high P/E cycles is vulnerable to read disturb, and accordingly a disturb factor $F_{Disturb}$ of the block DataBlk #n is determined based on the P/E cycles of the block DataBlk #n. As a result, a block read count of the block DataBlk #n is calculated by multiplying the page read count $PC_{LSB}$ of the LSB page with the latency factor $f_{LSB}$ corresponding to the LSB page, multiplying the page read count $PC_{LSB}$ of the CSB page with the latency factor $f_{CSB}$ corresponding to the CSB page and calculating a product of a summation of the multiplication results and the disturb factor $F_{Disturb}$ of the block DataBlk #n. The block read count of the block DataBlk #n is as follows.

$$(PC_{LSB} \times f_{LSB} + PC_{LSB} \times f_{LSB} + PC_{LSB} \times f_{LSB}) \times F_{Disturb}$$

In some embodiments, the latency factors $f_{LSB}$, $f_{CSB}$ and $f_{MSB}$ of various pages and the disturb factor $F_{Disturb}$ of various blocks can be defined in a formula or stored in a lookup table for further use according to different processes and technologies, which is not limited in the present embodiment.

Through the method disclosed above, the memory device is capable of appropriately adjusting the read counts in accordance with various factors (e.g. read latency, P/E cycles, temperature, etc.), so as to find the weak blocks and accordingly arrange data to reduce read disturb errors.

In some embodiments, an error-correcting circuitry is further applied to detect the errors occurred during read operations and accordingly trigger the method for managing read counts of the memory device as disclosed above.

Figure 6:
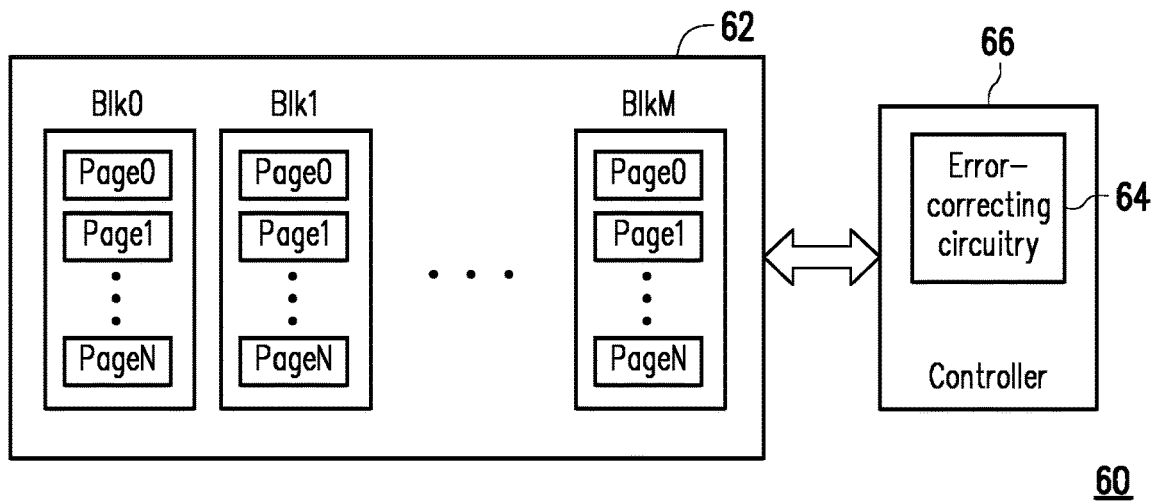
FIG. 6 is a schematic diagram illustrating the architecture of a memory device according to an embodiment of the application.

FIG. 6 is a schematic diagram illustrating the architecture of a memory device according to an embodiment of the application. Referring to FIG. 6, a memory device 60 is, for example, a NAND flash or a NOR flash, and includes a memory 62 and a controller 66 including an error-correcting circuitry 64. The functions of the memory 62 are the same as or similar to those of the memory 22 as described in previous embodiment, and thus the details are omitted herein. The memory device 60 differs from the memory device 20 in that the controller 66 further includes the error-correcting circuitry 64, which is, for example, an error checking and correcting (ECC) circuitry and used to correct errors occurred during read operations of the memory cells. Through generating ECC codes for the data to be stored and storing the ECC codes along with the data in the memory device 60, the error-correcting circuitry 64 is able to correct errors occurred during the read operations. A number of bits (i.e. the memory cells) that can be corrected by the error-correcting circuitry 64 is limited due to a finite redundancy of the algorithm. Whenever the number of the memory cells in a block corrected by the error-correcting circuitry 64 is over a threshold, the method for managing read counts of the memory device is triggered to reduce the read disturb errors.

Figure 7:
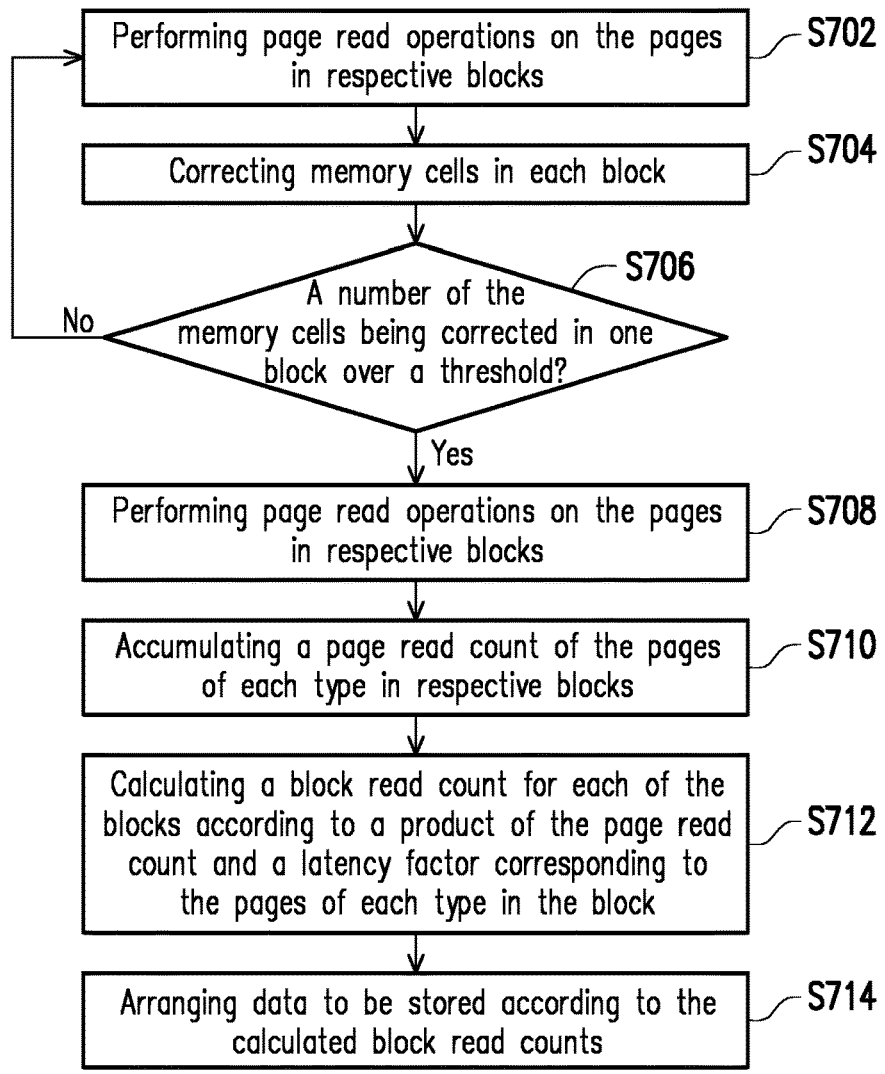
FIG. 7 is a schematic diagram illustrating a method for managing read counts of a memory device according to an embodiment of the disclosure.

FIG. 7 is a schematic diagram illustrating a method for managing read counts of a memory device according to an embodiment of the disclosure. Referring to FIG. 6 and FIG. 7, the method of the present embodiment is adapted for the above-mentioned memory device 60, and the detailed steps of the method will be described below with reference to various devices and components of the memory device 60.

First, in step S702, the controller 66 performs a page read operation on the pages in respective blocks through the corresponding word lines, and in step S704, the error-correcting circuitry 64 corrects errors occurred in each block during the page read operation.

In step S706, the controller 66 determines whether a number of the memory cells being corrected in one of the blocks of the memory 62 is over a threshold. The threshold is, for example, an integer between 30 to 40 bits, which is determined due to an error rate designed for the error-correcting circuitry 64 and is not limited in the present embodiment.

If the corrected number of the memory cells is not over the threshold, the flow is returned to step S702 in which the controller 66 continues performing the page read operation. Otherwise, the controller 66 begins to execute the method for managing read counts of the memory device as described in the previous embodiment.

In step S708, the controller 24 performs a page read operation on the pages in respective blocks through the corresponding word lines.

In step S710, the controller 24 accumulates a page read count of the pages of each type in respective blocks.

In step S712, the controller 24 calculates a block read count for each of the blocks according to a product of the page read count and a latency factor corresponding to the pages of each type in the block.

In step S714, the controller 24 arranges data to be stored according to the calculated block read counts.

The steps S708 to S714 are the same as or similar to the steps S302 to S308 as illustrated in the previous embodiment, and therefore the details are omitted herein.

Through the method disclosed above, the errors occurred during page read operations of the memory cells are monitored so as to timely trigger the method for managing read counts of the memory device, and appropriately arrange data to reduce read disturb errors.

In summary, in the memory device and the method for managing read counts of the memory device provided in the embodiments of the present disclosure, the read counts caused by the read disturb are appropriately adjusted by latency factors and/or disturb factors determined according to the characteristics of the memory pages or blocks when being read. A number of errors occurred during the read operations is monitored to timely trigger the method for managing read counts of the memory device. As a result, the blocks vulnerable to the read disturb can be identified and the data to be stored can be appropriately arranged so as to reduce read disturb errors.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A memory device comprising:
a plurality of memory cells arranged in series and organized into a plurality of blocks, wherein each of the blocks comprises a plurality of pages of two or more types;
a plurality of word lines respectively coupled to corresponding memory cells in the plurality of memory cells; and
a controller coupled to the plurality of word lines for performing page read operations on the pages in respective blocks through the corresponding word lines, and configured to;
accumulate a page read count of the pages of each type in respective blocks, wherein the page read count refers to a number of times the pages of each type have been read before an error occurs;
calculate a block read count for each of the blocks by multiplying the page read count with a latency factor corresponding to the pages of each type in the block and calculating a product of a summation of multiplication results and a disturb factor of the block, wherein the disturb factor is determined according to a program-erase cycle; and
arrange the data to be stored according to the calculated block read counts of the blocks.

2. The memory device of claim 1, wherein the latency factor corresponding to the pages of each type is determined according to a read latency of the pages of the respective type.

3. The memory device of claim 2, wherein the latency factor corresponding to the pages of each type is proportional to the read latency of the pages of the respective type.

4. The memory device of claim 1, wherein the types of the pages comprises a high page and a low page of a multi-level cell (MLC) NAND, or a least significant bit (LSB) page, a center significant bit (CSB) page, and a most significant bit (MSB) page of a triple-level cell (TLC) NAND.

5. A method for managing read counts of a memory device, adapted to the memory device comprising a plurality of memory cells arranged in series and organized into a plurality of blocks, a plurality of word lines respectively coupled to corresponding memory cells and a controller, wherein each of the blocks comprises a plurality of pages of two or more types, and the method comprises:
performing page read operations on the pages in respective blocks through the corresponding word lines;
accumulating a page read count of the pages of each type in respective blocks, wherein the page read count refers to a number of times the pages of each type have been read before an error occurs;
calculating a block read count for each of the blocks by multiplying the page read count with a latency factor corresponding to the pages of each type in the block and calculating a product of a summation of multiplication results and a disturb factor of the block, wherein the disturb factor is determined according to a program-erase cycle; and
arranging the data to be stored according to the calculated block read counts of the blocks.

6. The method of claim 5, wherein the latency factor corresponding to the pages of each type is determined according to a read latency of the pages of the respective type.

7. The method of claim 6, wherein the latency factor corresponding to the pages of each type is proportional to the read latency of the pages of the respective type.

8. The method of claim 5, wherein the types of the pages comprises a high page and a low page of a MLC NAND, or a LSB page, a CSB page, and an MSB page of a TLC NAND.

9. A memory device comprising:
   a plurality of memory cells arranged in series and organized into a plurality of blocks, wherein each of the blocks comprises a plurality of pages of two or more types;
   a plurality of word lines respectively coupled to corresponding memory cells in the plurality of memory cells; and
   a controller comprises an error-correcting circuitry configured to correct errors occurred during page read operations of the memory cells, wherein the controller is coupled to the plurality of word lines for performing the page read operations on the pages in respective blocks through the corresponding word lines, and configured to;
   in response to a number of the memory cells in one of the blocks corrected by the error-correcting circuitry being over a threshold, accumulate a page read count of the pages of each type in respective blocks, wherein the page read count refers to a number of times the pages of each type have been read before an error occurs;
   calculate a block read count for each of the blocks by multiplying the page read count with a latency factor corresponding to the pages of each type in the block and calculating a product of a summation of multiplication results and a disturb factor of the block, wherein the disturb factor is determined according to a program-erase cycle; and
   arrange the data to be stored according to the calculated block read counts of the blocks.

* * * * *